Figure 7:
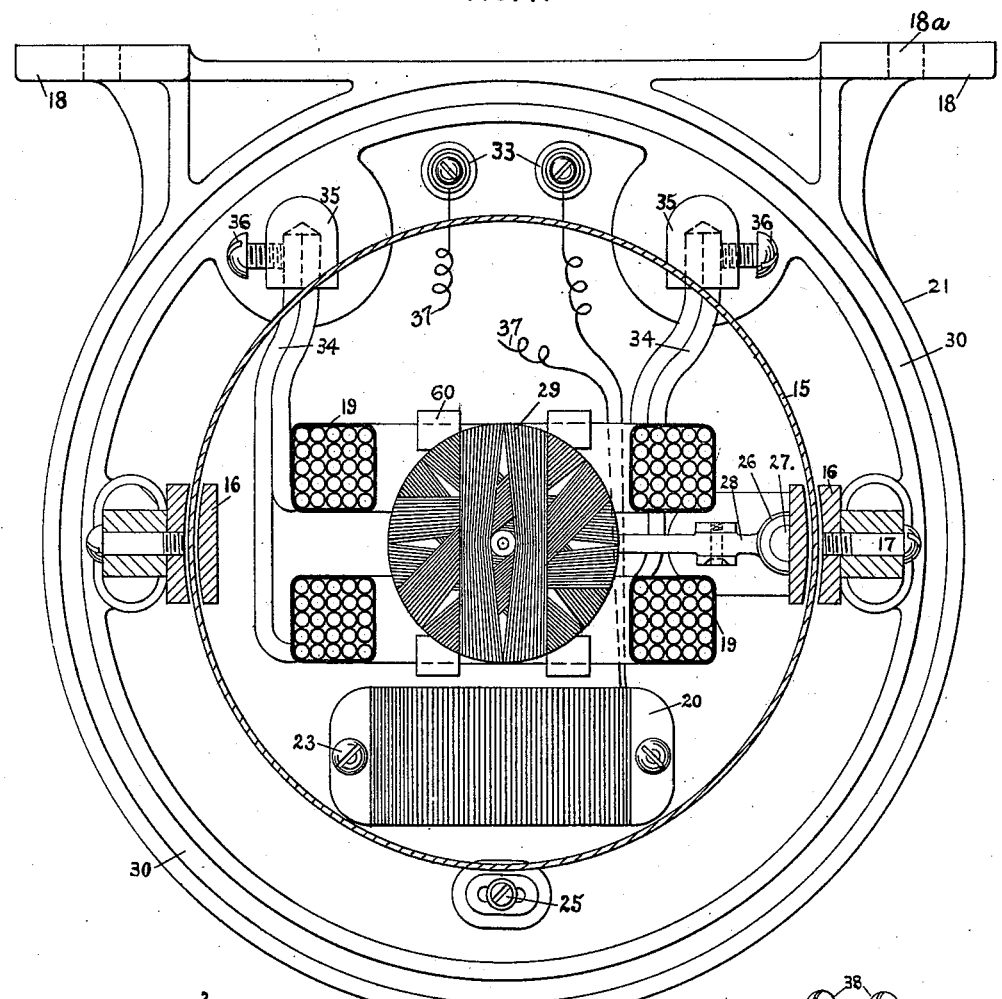

(No Model.)  5 Sheets—Sheet 1.
T. DUNCAN.
ELECTRICAL ENERGY INDICATOR.
No. 561,977.  Patented June 16, 1896.
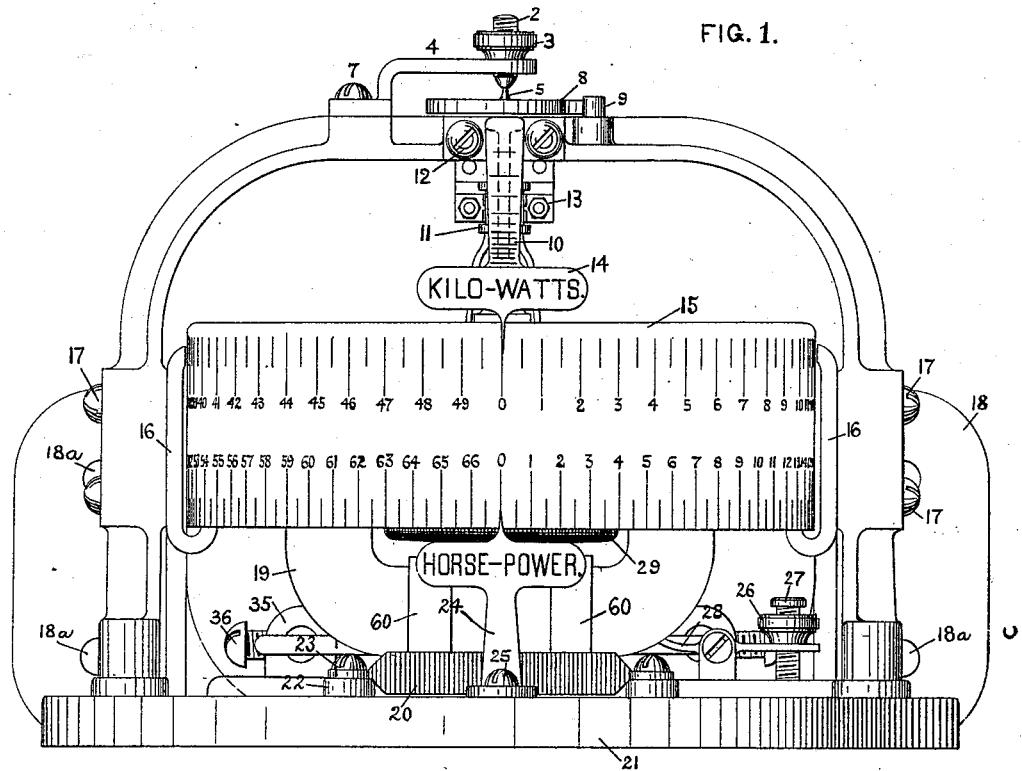
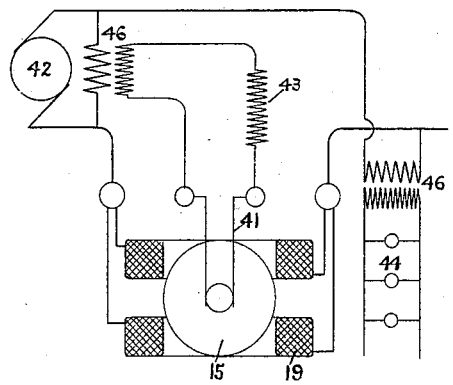
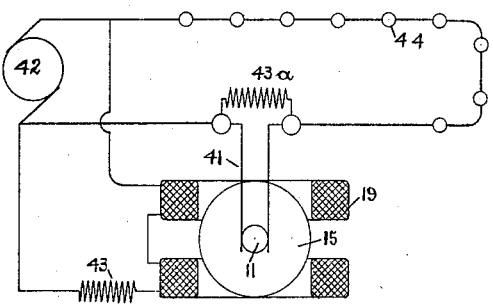
Witnesses
C. Plenting
J. E. Dalton.
Thomas Duncan Inventor
By his Attorney Wm Sturgis (No Model.)  5 Sheets—Sheet 2.
T. DUNCAN.
ELECTRICAL ENERGY INDICATOR.
No. 561,977. Patented June 16, 1896.
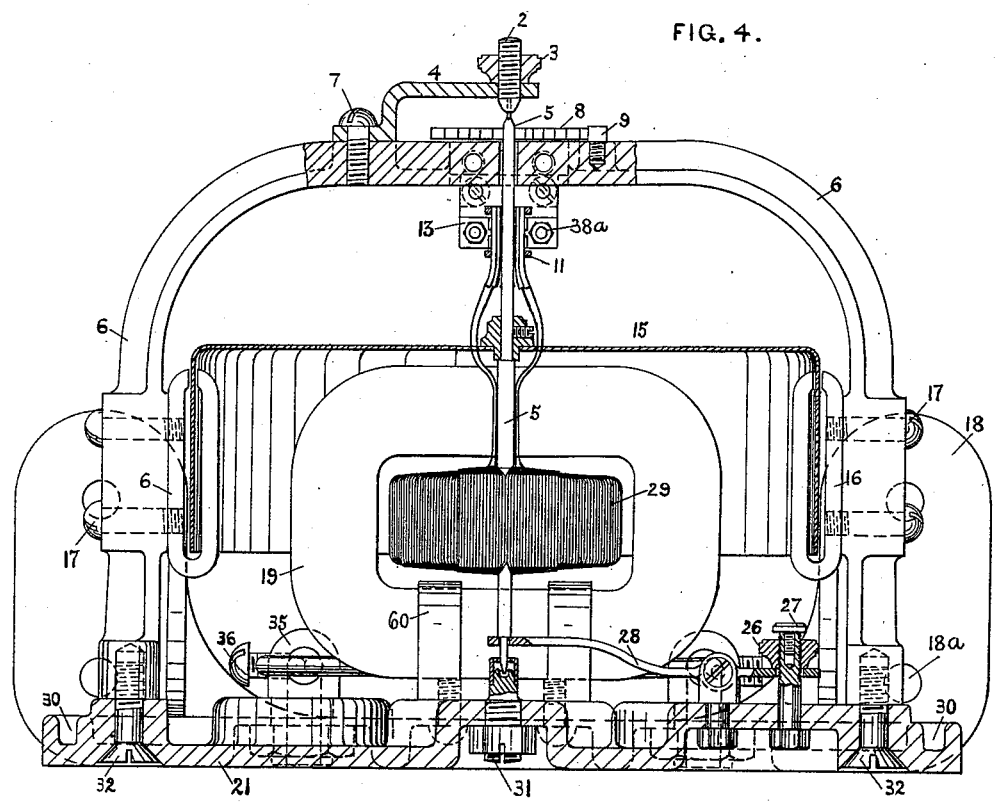
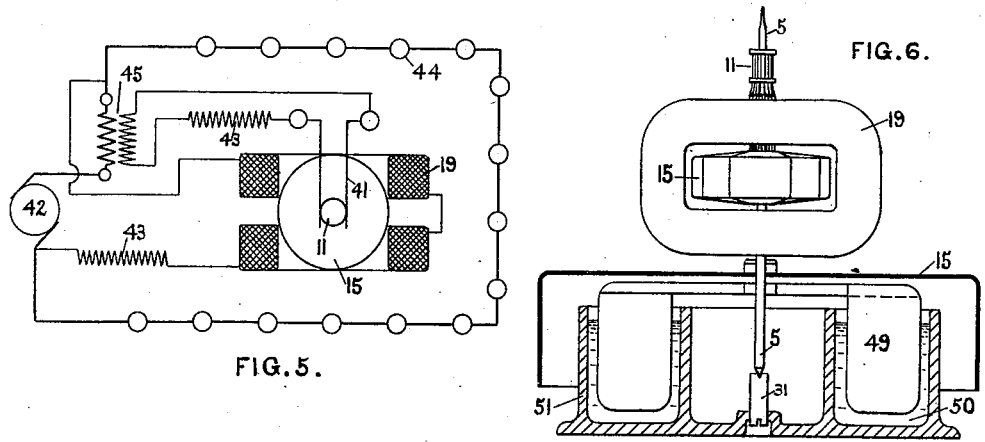
Witnesses
R. Planting
J. E. Dalton.
Thomas Duncan Inventor
By his Attorney Wm. Sturgis (No Model.) 5 Sheets—Sheet 3.

T. DUNCAN.
ELECTRICAL ENERGY INDICATOR.

No. 561,977. Patented June 16, 1896.

Witnesses
R. Planting
J. E. Dalton.

Inventor
Thomas Duncan
By his Attorney Wm Sturgis (No Model.) 5 Sheets—Sheet 4.

T. DUNCAN.
ELECTRICAL ENERGY INDICATOR.

No. 561,977. Patented June 16, 1896.

Witnesses
P. Planting
J. E. Dalton

Thomas Duncan Inventor
By his Attorney Wm Sturgis (No Model.) 5 Sheets—Sheet 5.

T. DUNCAN.
ELECTRICAL ENERGY INDICATOR.

No. 561,977. Patented June 16, 1896.

Witnesses
P. Planting
J. E. Dalton

Thomas Duncan Inventor
By his Attorney Wm. Sturgis

UNITED STATES PATENT OFFICE.

THOMAS DUNCAN, OF FORT WAYNE, INDIANA.

ELECTRICAL-ENERGY INDICATOR.

SPECIFICATION forming part of Letters Patent No. 561,977, dated June 16, 1896.

Application filed November 11, 1895. Serial No. 568,510. (No model.)

*To all whom it may concern:*

Be it known that I, THOMAS DUNCAN, a citizen of the United States, residing at Fort Wayne, in the county of Allen and State of Indiana, have invented certain new and useful Improvements in Electrical-Energy Indicators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to that class of apparatus for indicating the electrical energy of circuits which are delivering power for either lamps or motors, or both, and is particularly adapted to fill a want in central-station work, whereby the attendant can at a glance see directly the actual number of watts or horsepower that is being delivered to the external circuits at any instant.

Another object of the invention is to make it of wide application, so that the same instrument may be available for use on circuits of different voltages, and another feature of paramount importance—namely, that it will be applicable alike to either direct or alternating current circuits.

Heretofore it has been the practice in central stations to mark or write down every fifteen or thirty minutes, upon a suitable sheet or book provided for the purpose, the number of amperes being delivered or shown by the ammeter or current-indicator at that particular moment, so that some idea might be obtained how the load or output of the station varied during the hours of service. This method is unsatisfactory, since it does not tell the actual power that is being delivered, and when the amount of energy was to be known a second accounting of the electromotive force had to be kept, then the product of these two or the watts kept in a third column. This necessarily involved considerable time and trouble on the part of the station attendant and one into which many errors might enter without being detected. Again, take the case where the energy of alternate-current distribution is required to be known, the foregoing method of multiplying the amperes by the volts would not give the correct power unless the circuit was entirely free from inductance. If the circuit contains any inductive qualities, the real power or watts would be the apparent watts (volts multiplied by amperes) multiplied by the cosine of the angle of lag. It is, however, not easy for a station attendant to determine the angle of lag, with the cosine of which angle he has to multiply the apparent watts, in order to obtain the real power. Therefore, for the purpose of providing an instrument that will indicate instantaneously the real or true energy in both watts or electrical horse-power, or both, the present invention is intended to meet this demand.

Figure 8:
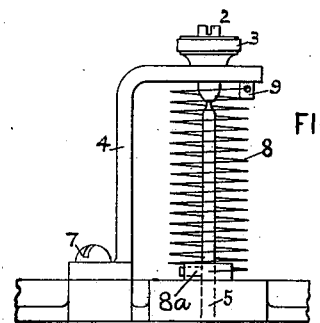
Figures 9, 10:
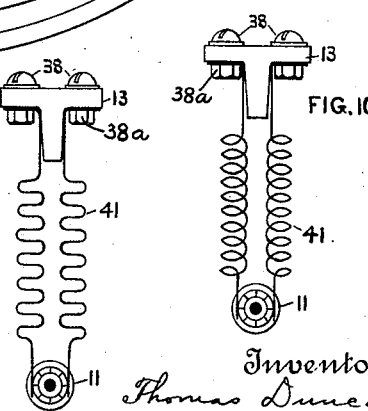
Figure 11:
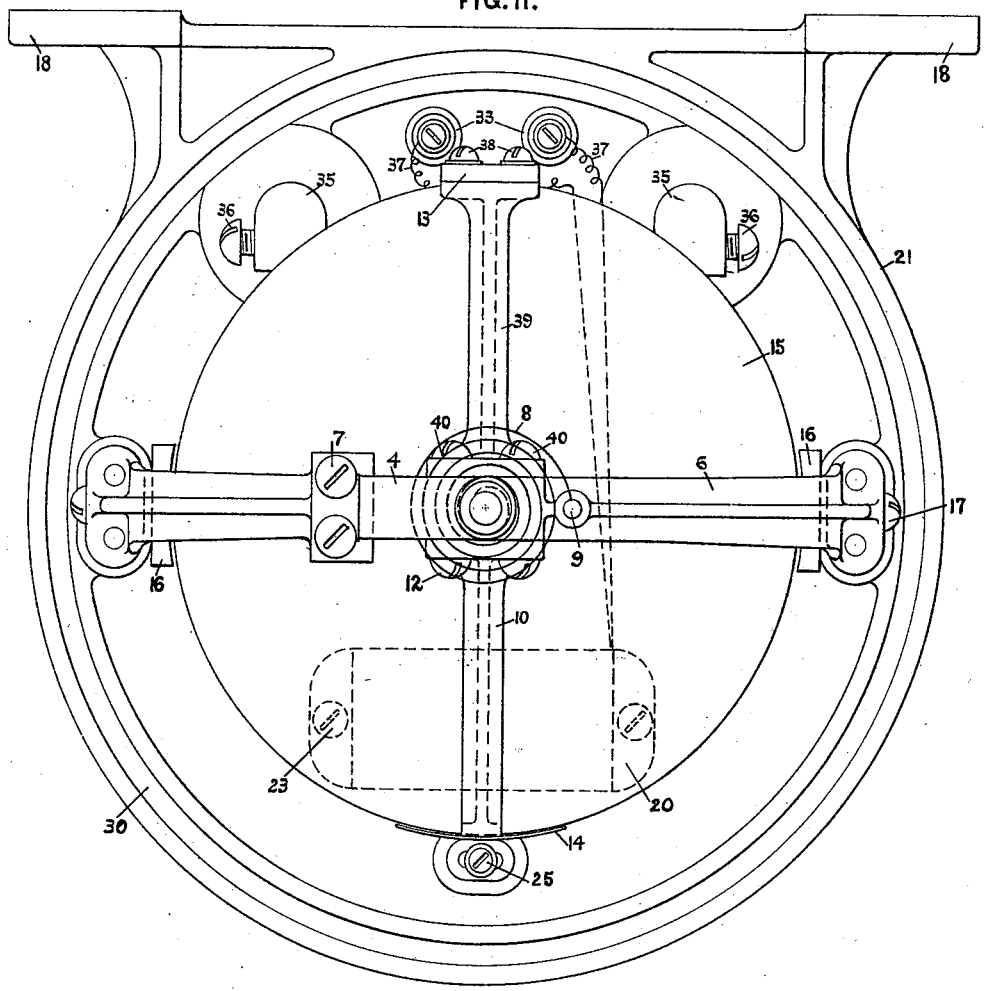

In the accompanying drawings, which are illustrative of my invention, Figure 1 is a front elevation of a form of electrical-energy indicator which I have found very suitable for practical use. Fig. 2 is a diagrammatic view of the connections necessary for measuring or indicating the energy given out by the generator 42. Figs. 3, 5, 12, 13, 14, 15, and 16 illustrate the different methods of connecting the indicator into the supply circuit or circuits, and to be more fully described hereinafter. Fig. 4 is a sectional elevation of my invention. Fig. 6 shows a method of making the instrument dead-beat. Fig. 7 is a plan view of the instrument, showing the location of the armature and field-coils, the latter being in section, as is also the cylinder and supporting-arch. In Fig. 8 is shown a form of spring for opposing the motion of the armature. Figs. 9 and 10 show my improved forms of brushes to prevent sparking. In Fig. 11 is also shown a plan view of the instrument, with the resistance and connections for same in dotted lines.

The following is a description of the construction and operation of my improved indicator, and in which similar parts are numbered to correspond throughout the several views and figures.

The principal elements employed in the construction of the invention are a double stationary field-coil 19, which is held in a suitable manner upon the base 21, an armature 29 of any suitable construction and revoluble within the said field-coils 19, a vertical shaft 5, resting upon a jeweled bearing 31 and held in position at its upper end by a bearing 2, a commutator 11, of aluminium alloyed with silver and mounted upon said shaft and electrically connected with the said armature, a spring 8 of any suitable construction for opposing the motion of the armature, a metallic cylinder or inverted cup 15, also mounted rigidly upon and movable with the said shaft and carrying upon its outer surface a suitable scale for indicating the energy, a plurality of magnets arranged so that their flux will cut the said cylinder when in motion, an adjustable lever-arm 28 for raising and lowering the shaft into and out of the jeweled bearing 31, a non-inductive resistance 20, placed in series with the armature, and brushes bearing upon and making contact with the commutator.

In order that the insulated field-coils 19 may be securely fastened upon the base 21, I employ the clamps 60. Their terminals 34, as shown in Fig. 7, are connected in multiple to the binding-posts 35 of the instrument with the screws 36. These coils are then connected in series in the service-mains and are representative of the amount of current in amperes that passes through them. Connection with the service-wires is made from underneath in the usual manner through holes in the base, but not shown in the drawings. These series or ampere coils closely surround or embrace the armature 29, which may be wound like a Gramme, Siemens, or any other suitable form, and connected to the terminals 33. These are connected in multiple to the circuit or part representing the difference of potential to be measured.

The brushes 41, which press against the commutator 11, are connected in circuit by joining one of their terminals or ends 38, Figs. 9 and 10, in series with the resistance 20, then connecting the other end of the resistance to one of the shunt-terminals 33, and the remaining brush-terminal 38 to the other terminal post 33, as in Fig. 7.

When current flows through the series coils, Figs. 1, 2, 4, 7, 14, 15, and 16, there is established a field of magnetism that is representative of the current strength flowing at any instant and will vary in exact ratio thereto. This magnetic field, therefore, will represent the current or ampere factor in the operation of the instrument. It being necessary that the electromotive force be represented by another field of magnetism, I employ the wound armature 29, the terminals of which receive current from the circuit in multiple, thereby producing a magnetic field that will vary with the electromotive force. There is then a tendency of the armature to rotate, since it is mounted with this freedom upon the jeweled bearing 31, its action being similar to that governing the production of rotation in all commutated motors. If no obstruction was present, the armature would rotate in the ordinary manner, but this would render the instrument unfit for the purpose herein specified. Therefore I employ a suitable spring 8, against which the armature exerts its torque. This spring is fastened at one end to the shaft, the other end being suitably secured on the arch 6 by the post 9.

When no current is flowing through the series coils 19, no movement or deflection of the armature will take place, even though it be energized itself, since two lines of magnetism must exist before any torque will be exhibited; but as soon as current flows through these ampere-coils the armature is deflected with a strength equal to the product or attraction of these two fields or lines of magnetism, which represent the amperes and volts, respectively. If any change takes place in either circuit—i. e., if the current strength increases or decreases or the pressure varies—a corresponding change in the magnetism representing each factor will also take place, so that at any instant the torque will be exactly representative of the product of these two fields or the amperes multiplied by the volts. The torque exerted is proportional to the watts at any instant. Therefore some force must be made to oppose the motion of the armature in order that it will give a definite deflecting for a given number of watts. This is obtained by the aforementioned spring, which is so adjusted that as soon as the armature commences to rotate it is obliged to wind up this spring, and in overcoming this work the armature revolves or moves through a given distance only and makes one complete revolution in indicating its total capacity.

In order to make the indicator dead-beat, I employ the aluminium cylinder 15 and cause it to travel in a magnetic field set up by the magnets 16, which are fastened upon the arch 6 with the screws 17. Any motion on the part of the cylinder causes induced currents to be established therein, and which react upon the magnets 16, tending to stop it, thereby preventing it from oscillating or swinging backward and forward, as would otherwise take place if the current or pressure was constantly varying. In addition to its performing the function of a drag or magnetic brake, it also becomes the indicating-dial, the scale being engraved or placed in any suitable manner upon its outer diameter, as shown, and carried around with the armature upon the spindle or shaft. The pointers 14 and 24 show upon the upper and lower scales of the cylinder the true watts or horse-power passing through the indicator at any instant.

The foregoing description relates only to a form used for indicating the instantaneous energy on constant-potential circuits—i. e., circuits wherein the electromotive is approximately constant and the current in amperes varying as the translating devices require.

Therefore I do not wish to be understood as limiting myself to the foregoing application, since I can apply it to any circuit or system of distribution in a simple and suitable manner for indicating the total energy passing and being used, as hereinafter set forth.

The indications of the instrument are correct for wide variations in electromotive force upon constant-potential circuits, and by employing a suitable set of resistances connected in the form of a rheostat I can apply it to circuits of different electromotive forces—such as fifty, one hundred, two hundred and twenty, five hundred, one thousand, fifteen hundred, and two thousand volts—by switching in more or less of the resistances, which would be marked for this purpose, and using multiplying constants for each resistance.

When made to measure or indicate the total energy on either series arc or incandescent circuits, I connect the stationary energizing-coils 19 in multiple around the terminals of the generator 42, as shown in Fig. 3, and excite the armature by the electromotive force or drop developed in the resistance $43^a$, which is also connected in series in the main circuit. This being a series circuit, the current is assumed to be constant, and since a constant current flowing through the resistance $43^a$ will produce a constant drop in volts at the terminals of the armature 15 the amount of current traversing said armature will remain constant as long as the current in the main line does; but if any change in the current strength takes place a corresponding change will also take place in the drop of the resistance $43^a$, which will cause more or less current to traverse the armature. In this manner the field created by the armature will always be a correct representation of the strength of the current in the series or main circuit. The stationary energizing-coils 19 being connected in parallel, their strength will vary with the electromotive at the brushes of the generator, and since the armature-field varies with the series current the torque will be the product of these two forces. This type or form will be very applicable for indicating the energy being delivered by arc-light and series incandescent dynamos. Upon the indicating-drum I can also place a third scale calibrated to read in lamps, so that the station attendant can at a glance see the number of lamps that are in operation upon the circuit.

Fig. 2 shows an improved indicator operating upon primary alternating currents, in which the series energizing-coils 19 are connected into the mains, and through which all the current passes from the generator 42. A transformer 46 is connected in parallel upon the primary circuit, and having its secondary circuit exciting the armature and in series with a resistance 43. The figure also shows another or work transformer 46, with its secondary circuit and lamps 44. I have also employed a specially-proportioned transformer, so that its electromotive force would be low enough to connect directly to the armature-terminals, without having to connect a resistance in series therewith, to prevent too much current from passing through the armature. This arrangement also keeps down the losses in the armature-circuit that would otherwise follow.

In Fig. 3 the arrangement for applying it to a constant-current circuit is shown, and in which the energizing-coils 19 are in parallel to the supply-mains, while the armature is shunted around a resistance $43^a$, that is connected in series with the lamps 44. If the current remains constant through the lamps, the drop over the resistance $43^a$ will also be constant, thereby causing the armature to represent the current strength to be constant on account of its being subjected to the drop over said $43^a$ resistance; but if the current slightly increases or decreases the drop over $43^a$ will also vary in a similar proportion, which will also energize the armature in turn, so that the current passing through it at any instant will be an exact representation of the current flowing through the circuit and lamps 44. As these lamps 44 are put in operation or use the electromotive force will vary at the terminals of the machine; but since the coils 19 are connected in parallel the amount of current passing through them will be an exact representation of the difference of potential between the two terminals of the machine 42. Hence at any moment the instrument will read the power represented by the pull between armature and field-coil, or the product of the current and volts. For varying the capacity of the meter and also for convenience in standardizing I can employ a variable resistance in series with the volt-coils 19, the result being well understood by those skilled in the art. I have also used a resistance in series with the armature when shunted around the series resistance $43^a$ for standardizing; but this arrangement is not shown.

Fig. 5 shows a method of indicating the electrical energy on constant-current-alternating circuits. In this arrangement, as in Fig. 3, the volt or energizing-coils 19 are in parallel to the machine-terminals; but instead of supplying the armature with current from a resistance I employ a small transformer 45, having its primary connected in series in the main circuit. This makes a very desirable method of energizing the armature without having to connect it to the main line direct, which would undoubtedly cause trouble if it should happen to be grounded.

Fig. 6 shows another way of applying a drag to prevent the motion or indication of the instrument from being jerky or unstable. It consists of a winged fan 49, immersed in a suitable liquid 50 and contained in the receiving-vessel 51. This necessarily prevents the motion from being too sudden and aids it in giving readings that are dead-beat. I have also used an air dash-pot with equally good results; but any suitable arrangement for the purpose of obtaining the end in view may be applied. Therefore I do not limit myself to the methods or arrangements herein shown or described.

For opposing the motion or torque of the armature I have obtained excellent results with the spring 8 and the other parts shown in Fig. 8. This spring is attached at its upper end to the set-screw 9 and to the spindle 5 at its lower end by the collar and set-screw 8$^a$. This spring can be twisted or tightened upon the shaft for the purpose of calibrating or varying its capacity. The arm or support 4 is firmly screwed upon the arch 6 with the screw 7, and carries at its top the upper bearing 2 with its set-nut 3.

Figs. 9 and 10 show my improved brushes for preventing sparking at the commutator. This sparking invariably takes place when the meter is subjected to mechanical vibration, which causes the brushes to tremble or vibrate upon the commutator, thereby making the commutator black and rough in a short time and eventually unfit for use. If any vibration is communicated to the meter, it is found to have no effect whatever upon the commutator and brush-contact, since the vibration is taken up or neutralized by the corrugations or spirals 41. This improvement will be appreciated by central-station men, who as a rule are troubled seriously with commutated station-meters by the brushes trembling and the commutator sparking and rapidly oxidizing, due to the vibration of the machinery in the station. The brushes are connected to the shunt-wires by being placed underneath the heads of the screws 38, when they are tightened in place with the small nuts 38$^a$. The necessary insulation is afforded by the hard-rubber part or support 13.

Figure 12:
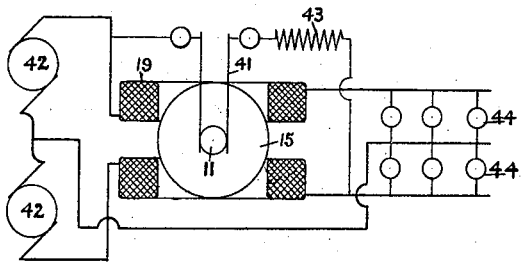

When the instrument is used to indicate the total energy delivered by two generators on the three-wire system, the arrangement shown in Fig. 12 answers the purpose well. The outer main from each dynamo 42 is connected through one of the series energizing-coils 19 to the load or lamps 44. The armature is connected in multiple across the same outer mains and in series with a resistance 43, thereby subjecting it to the total drop across both machines.

Figure 13:
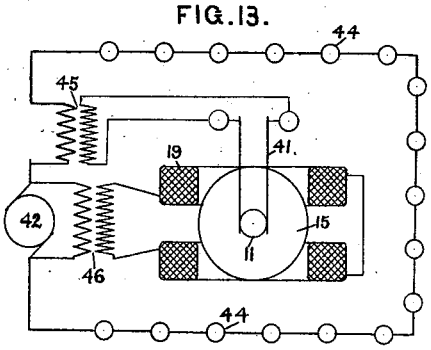

In Fig. 13 I have shown a method of indicating the energy delivered by a series alternating-current system of distribution without connecting either the field-coils 19 or armature 15 into the circuit direct. This admits of the instrument being readily and easily used in connection with very high pressures, since no part of it is in actual contact with the circuit. As will be seen in the figure, I employ two small transformers, one, 46, which is in parallel to the mains of the dynamo 42, the other, or 45, being in series in the main line supplying the lamps 44.

In transformer 46 the electromotive force will vary as the number of lamps 44 are used. Hence the current flowing in the coils 19 will represent the difference of potential at the terminals of the machine. In the other transformer, 45, the current given out by it will be constant, since the current in the primary is constant. These transformers I can construct to give a low electromotive force, so that no extra resistance need be employed.

Figure 14:
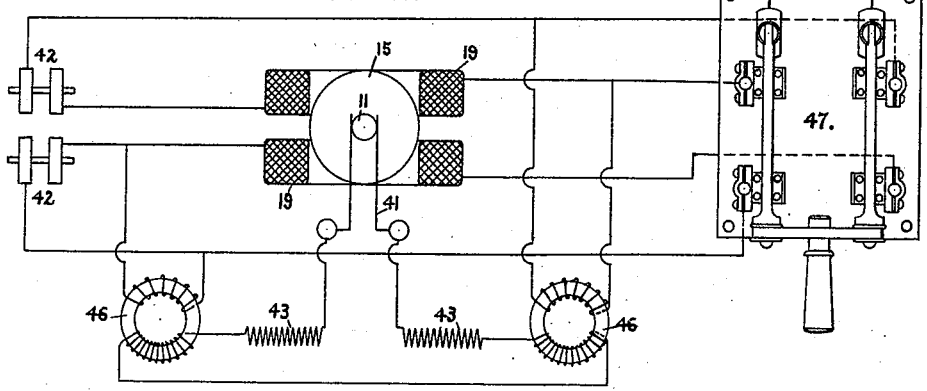

For use where two alternators are running in parallel the connections as shown in Fig. 14 answer. Each of the two dynamos 42 are respectively connected through the two energizing-coils 19, the armature being connected in series with the secondaries of the two transformers 46, and in which two resistances 43 are also shown. The mains connect with the switch 47.

Figure 15:
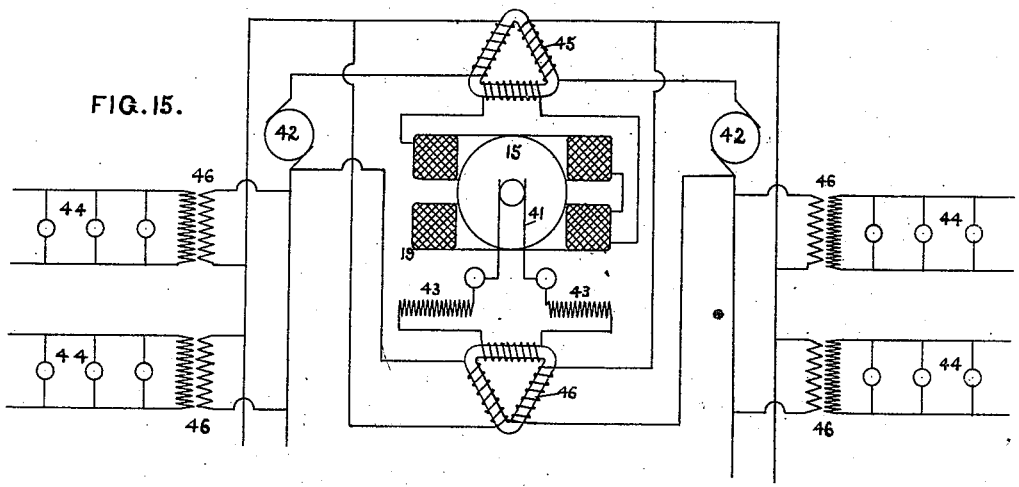

Fig. 15 also shows another method of indicating the total energy being delivered by two alternators, and differing from that shown in Fig. 14 by having the primary of each dynamo energize the transformer 45, and whose secondary is in series with and energizes the meter-coils 19. The secondary from the other transformer, 46, energizes the armature 15, its primary consisting of two independent coils or windings, one from each machine, as shown.

Figure 16:
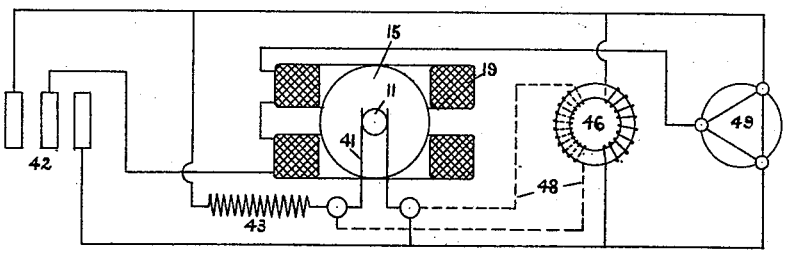

Fig. 16 illustrates the indicator connections for a quarter or two-phase system of distribution. The coils 19 are connected in series in the common return-lead, the armature being in parallel to the two outer leads. When indicating with a very high electromotive force, a transformer 46 may be employed to energize the armature and connected as shown by the dotted lines 48. Upon the arch 6 is also fastened with screws 12 a cast support 10, which holds the sign and pointer 14 in position over the movable drum and scale. The lower pointer 24 is secured upon the base 21 with the screw and washer 25, as shown in Fig. 11. The resistance for connecting in series with the armature rests upon the standards 22 and held thereon with the screws 23. When the indicator is in position and wired for service, the shaft is lowered down upon its bearing by raising the thumb-nut 26 upon the threaded rod 27, which allows the arm 28 to drop. The end of this arm is forked and grips the beveled shoulder of the shaft.

To prevent the entrance of dust, I can employ a suitable cover, such as a glass dome, and which fits into the groove 30 upon the base 21.

The brushes 41 are held in position by a cast piece 39, fastened to the main arch 6 by the screws 40. For the purpose of mounting upon the switchboard or other support the holes 18$^a$ are provided upon the projecting lugs 18.

In the operation of commutated motor instruments an endless source of trouble is experienced by the contacts becoming oxidized and causing sparking, which invariably results in making the commutator rough and introducing excessive friction. To prevent these faults from occurring, I employ a commutator and brushes made from an alloy of aluminium and silver, which I find to answer the purpose better than any other metal. Using aluminium alone I find to become rough, although it remains unoxidized for a long time. Silver, which has been extensively used for this purpose, has never been satisfactory on account of its becoming tarnished and black. The alloy above mentioned I find to be an ideal solution to this problem, since it neither becomes rough nor tarnished.

What I claim as my invention is—

1. The combination with an electric-energy indicator, of a movable wound armature, a commutator, and the elastic brushes for neutralizing any vibration imparted to them as herein set forth.

2. The combination with an electric meter, of the corrugated or spirally-constructed brushes, for giving them elasticity in the manner shown and for the purpose set forth.

3. The combination with a movable scale of a wound armature, a commutator, spirally-constructed brushes pressing against said commutator, and two series coils located inside of said movable scale.

4. The combination with the arch 6 of the supplemental arm 4, the upper bearing 2, the check-nut 3 for keeping said bearing in place when once adjusted, the spiral spring 8, a shunt-wound armature, a spindle carrying said armature series coils, and a movable scale located over and covering said series coils.

5. The combination with an electric-energy indicator for alternating and direct currents of the lever-arm 28, the post 27, a vertical spindle, the thumb-nut 26 for raising and lowering said spindle, a shunt-wound armature, series coils within which said armature moves, and an inverted-cup-shaped scale mounted upon the vertical spindle and carrying two distinct scales upon its outer periphery and which represent two distinct units of measurement.

6. The combination with the vertical spindle, of a spiral spring concentric with and opposing the motion of said spindle, a wound armature, a commutator, spirally-formed brushes pressing against said commutator, and a movable scale mounted upon said spindle for the purpose set forth.

7. In an electric-energy indicator for alternating currents, the combination with a commutated motor of the resistance 43$^a$, shunted around the armature of said motor, and a movable drum being opposed or retarded in its motion and having upon its outer periphery two separate scales, each reading in different units of measurement, and pointers extending over said drum from above and below for indicating the amount of energy.

8. The combination in an electrical-energy indicator of a motor whose torque varies as the power or watts, a movable circular scale, and a damping device consisting of a rigid winged fan so as to present a constant surface to the medium in which it moves, a suitable liquid for opposing the motion of said fan, and a containing vessel 51 for the purpose set forth.

In testimony whereof I affix my signature, in presence of two witnesses, this 7th day of November, A. D. 1895.

THOMAS DUNCAN.

Witnesses:
ROBERT F. HARDING,
WILLARD C. KNIGHT.